(12) United States Patent
Kwon et al.

(10) Patent No.: US 12,496,876 B2
(45) Date of Patent: Dec. 16, 2025

(54) VEHICLE SOLAR SYSTEM AND METHOD OF CONTROLLING THE SAME

(71) Applicants: HYUNDAI MOTOR COMPANY, Seoul (KR); KIA CORPORATION, Seoul (KR)

(72) Inventors: Chun Kyu Kwon, Hwaseong-si (KR); Hyun Sub Lee, Hwaseong-si (KR); Jong Woo Nam, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 165 days.

(21) Appl. No.: 18/377,901

(22) Filed: Oct. 9, 2023

(65) Prior Publication Data

US 2025/0010689 A1 Jan. 9, 2025

(30) Foreign Application Priority Data

Jul. 7, 2023 (KR) ........................ 10-2023-0088446

(51) Int. Cl.
*B60H 1/00* (2006.01)
*B60H 1/22* (2006.01)
*B60L 8/00* (2006.01)
*B60L 58/26* (2019.01)
*H02S 40/42* (2014.01)

(52) U.S. Cl.
CPC ........... *B60H 1/22* (2013.01); *B60H 1/00278* (2013.01); *B60L 8/003* (2013.01); *B60L 58/26* (2019.02); *H02S 40/425* (2014.12); *B60H 2001/00307* (2013.01); *B60H 2001/2278* (2013.01); *B60L 2240/36* (2013.01); *B60L 2270/44* (2013.01)

(58) Field of Classification Search
CPC .................. B60H 1/22; B60H 1/00278; B60H 2001/00307; B60H 2001/2278; H02S 40/425; B60L 58/26; B60L 8/003; B60L 2240/36; B60L 2270/44
USPC ........................................................ 165/202
See application file for complete search history.

(56) References Cited

U.S. PATENT DOCUMENTS

2016/0089970 A1 * 3/2016 Jackson ................. B60K 11/02
180/2.2

FOREIGN PATENT DOCUMENTS

| CN | 207106418 U | * | 3/2018 |
| DE | 102015103589 A1 | * | 12/2015 |
| KR | 10-0171722 B1 | | 3/1999 |
| KR | 2011-0004198 A | | 1/2011 |

\* cited by examiner

*Primary Examiner* — Davis D Hwu
(74) *Attorney, Agent, or Firm* — MCDONNELL BOEHNEN HULBERT & BERGHOFF LLP

(57) ABSTRACT

A vehicle solar system includes a solar module mounted on an exterior surface of a vehicle, the solar module including a solar panel and a cooling channel positioned in the solar panel; a heat storage tank thermally connected to the cooling channel of the solar module; and a panel radiator thermally connected to the heat storage tank.

17 Claims, 5 Drawing Sheets

VEHICLE SOLAR SYSTEM AND METHOD OF CONTROLLING THE SAME

CROSS REFERENCE TO RELATED APPLICATIONS

This application is based on and claims the benefit of priority to Korean Patent Application No. 10-2023-0088446, filed on Jul. 7, 2023, in the Korean Intellectual Property Office, the disclosure of which is incorporated herein in its entirety by reference.

TECHNICAL FIELD

The present disclosure relates to a vehicle solar system using solar energy and a method of controlling the same, and more particularly, to a vehicle solar system and a method of controlling the same designed to use solar energy in vehicle thermal management (heating of a passenger compartment, warming-up of a battery, etc.) as well as converting solar energy into electric energy, thereby significantly improving efficiency of solar energy utilization.

BACKGROUND

In accordance with the Paris Agreement, it is necessary to utilize solar energy, which is representative renewable energy, for carbon neutrality. Solar power generation is a system that absorbs solar energy (sunlight, solar heat) and converts the solar energy into electric energy without environmental pollution, and its power generation efficiency is very low, about 10%. That is, only some of the solar energy may be converted into electric energy, and the rest may be discarded as thermal energy. Such discarded thermal energy may increase the temperature of solar cells. As the temperature of the solar cells increases, conversion efficiency thereof may decrease. For example, when the temperature of the solar cells rises by approximately 10° C., the conversion efficiency thereof may be reduced to 4%.

Meanwhile, it is expected to increase the use of solar power for vehicles in accordance with carbon neutrality and life cycle assessment (LCA), and it is necessary to improve the efficiency of solar energy utilization.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle solar system and a method of controlling the same designed to use solar energy in vehicle thermal management (heating of a passenger compartment, warming-up of a battery, etc.) as well as converting solar energy into electric energy (power generation), thereby significantly improving efficiency of solar energy utilization.

According to an aspect of the present disclosure, a vehicle solar system may include a solar module mounted on an exterior surface of a vehicle, the solar module including a solar panel and a cooling channel positioned in the solar panel; a heat storage tank thermally connected to the cooling channel of the solar module; and a panel radiator thermally connected to the heat storage tank.

The heat storage tank may include a heat storage chamber in which a heat storage material is stored, a first coolant chamber contacting a first side surface of the heat storage chamber, and a second coolant chamber contacting a second side surface of the heat storage chamber.

The first coolant chamber may be fluidly connected to the cooling channel of the solar module through a first coolant circulation circuit.

The first coolant circulation circuit may include: a first coolant supply line allowing a first coolant to flow from the first coolant chamber to the cooling channel of the solar module, a first coolant return line allowing the first coolant to return from the cooling channel of the solar module to the first coolant chamber, and a first coolant pump allowing the first coolant to circulate.

The first coolant pump and the first coolant chamber may be integrally joined.

The second coolant chamber may be fluidly connected to the panel radiator through a second coolant circulation circuit.

The vehicle solar system may further include an auxiliary heat exchanger fluidly connected to the second coolant chamber through the second coolant circulation circuit. The second coolant chamber may be thermally connected to a heating, ventilation, and air conditioning (HVAC) system through the auxiliary heat exchanger.

The vehicle solar system may further include a battery chiller fluidly connected to the second coolant chamber through the second coolant circulation circuit. The second coolant chamber may be thermally connected to a battery cooling system through the battery chiller.

The second coolant circulation circuit may be configured to direct a second coolant discharged from the second coolant chamber to at least one of the panel radiator, the auxiliary heat exchanger, and the battery chiller, and to allow the second coolant to return to the second coolant chamber.

The second coolant circulation circuit may include a second coolant supply line allowing the second coolant to flow from the second coolant chamber to the panel radiator, the auxiliary heat exchanger, and the battery chiller, a second coolant return line allowing the second coolant to return from the panel radiator, the auxiliary heat exchanger, and the battery chiller to the second coolant chamber; a plurality of distribution lines branched from the second coolant supply line and joined at the second coolant return line, a control valve disposed between the second coolant supply line and the plurality of distribution lines; and a second coolant pump allowing the second coolant to circulate. The the panel radiator is connected to a first distribution line of the plurality of distribution lines, the auxiliary heat exchanger is connected to a second distribution line of the plurality of distribution lines, and the battery chiller is connected to a third distribution lines of the plurality of distribution lines.

The control valve and the second coolant pump may be integrally joined to the second coolant chamber.

The plurality of distribution lines may include the first distribution line branched from the second coolant supply line to the panel radiator, the second distribution line branched from the second coolant supply line to the auxiliary heat exchanger, and the third distribution line branched from the second coolant supply line to the battery chiller.

The control valve may include an inlet port communicating with the second coolant chamber, a first outlet port communicating with the panel radiator, a second outlet port communicating with the auxiliary heat exchanger, and a third outlet port communicating with the battery chiller.

The control valve may be configured to open at least one of the first outlet port, the second outlet port, and the third outlet port.

According to another aspect of the present disclosure, a method of controlling a vehicle solar system including a solar module including a solar panel and a cooling channel positioned in the solar panel, a heat storage tank fluidly connected to the cooling channel of the solar module through a first coolant circulation circuit, a panel radiator fluidly connected to the heat storage tank through a second coolant circulation circuit, an auxiliary heat exchanger fluidly connected to the heat storage tank through the second coolant circulation circuit and thermally connected to an HVAC system, and a battery chiller fluidly connected to the heat storage tank through the second coolant circulation circuit and thermally connected to a battery cooling system, may include: allowing a first coolant to circulate between the cooling channel and the heat storage tank based on a temperature of the heat storage tank and a temperature of the solar panel; and allowing a second coolant to circulate between the heat storage tank and the panel radiator based on the temperature of the solar panel.

The method may further include allowing the second coolant to circulate between the heat storage tank and the panel radiator based on the temperature of the heat storage tank and the temperature of the solar panel.

The method may further include allowing the second coolant to circulate between the heat storage tank and the auxiliary heat exchanger based on an ambient temperature.

The method may further include allowing the second coolant to circulate between the heat storage tank and the battery chiller based on the temperature of the heat storage tank and a temperature of a battery.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
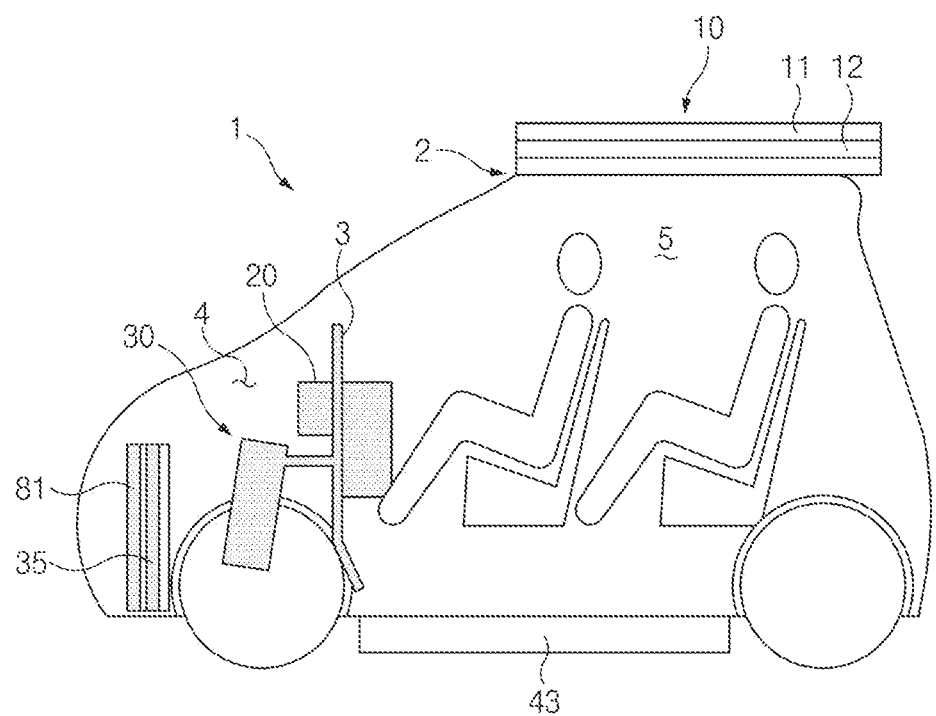
FIG. 1 illustrates a vehicle solar system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle solar system according to an exemplary embodiment of the present disclosure may include a solar module 10 mounted on an exterior surface of a vehicle 1, and a heat storage tank 20 thermally connected to the solar module 10. The vehicle 1 may include a front compartment 4 and a passenger compartment 5 partitioned by a dash panel 3. A heating, ventilation, and air conditioning (HVAC) system 30 may be mounted on the dash panel 3 so that it may be located between the front compartment 4 and the passenger compartment 5.

The solar module 10 may be mounted on a roof 2 of the vehicle 1. The solar module 10 may include a solar panel 11, and a cooling channel 12 provided in the solar panel 11. The solar panel 11 may be a photovoltaic thermal (PVT) panel in which a photovoltaic panel and a solar thermal panel are joined, and be configured to generate electricity and heat. As a first coolant passes through the cooling channel 12, the solar panel 11 may be maintained at an appropriate temperature to improve power generation efficiency.

The solar panel 11 may convert solar energy into electric energy so that the solar panel 11 may generate the electric energy. A converter 15 may be electrically connected to the solar panel 11, and the converter 15 may be configured to supply the electric energy generated from the solar panel 11 to a battery 43. A first temperature sensor TS1 may be mounted on the solar panel 11, and the first temperature sensor TS1 may sense the temperature of the solar panel 11.

The heat storage tank 20 may include a heat storage chamber 21 (shown in FIGS. 2-3) in which a heat storage material is stored, and the heat storage material may be phase change materials (PCM). A second temperature sensor TS2 may be mounted on the heat storage chamber 21, and the second temperature sensor TS2 may sense the temperature of the heat storage chamber 21.

The heat storage tank 20 may include a first coolant chamber 22 (shown in FIGS. 2-3) contacting a first side surface of the heat storage chamber 21, and the first coolant chamber 22 may be thermally and fluidly connected to the cooling channel 12 of the solar module 10 through a first coolant circulation circuit 50.

The first coolant circulation circuit 50 (shown in FIGS. 2-3) may be configured to allow the first coolant to circulate between the cooling channel 12 of the solar module 10 and the first coolant chamber 22.

Figure 2:
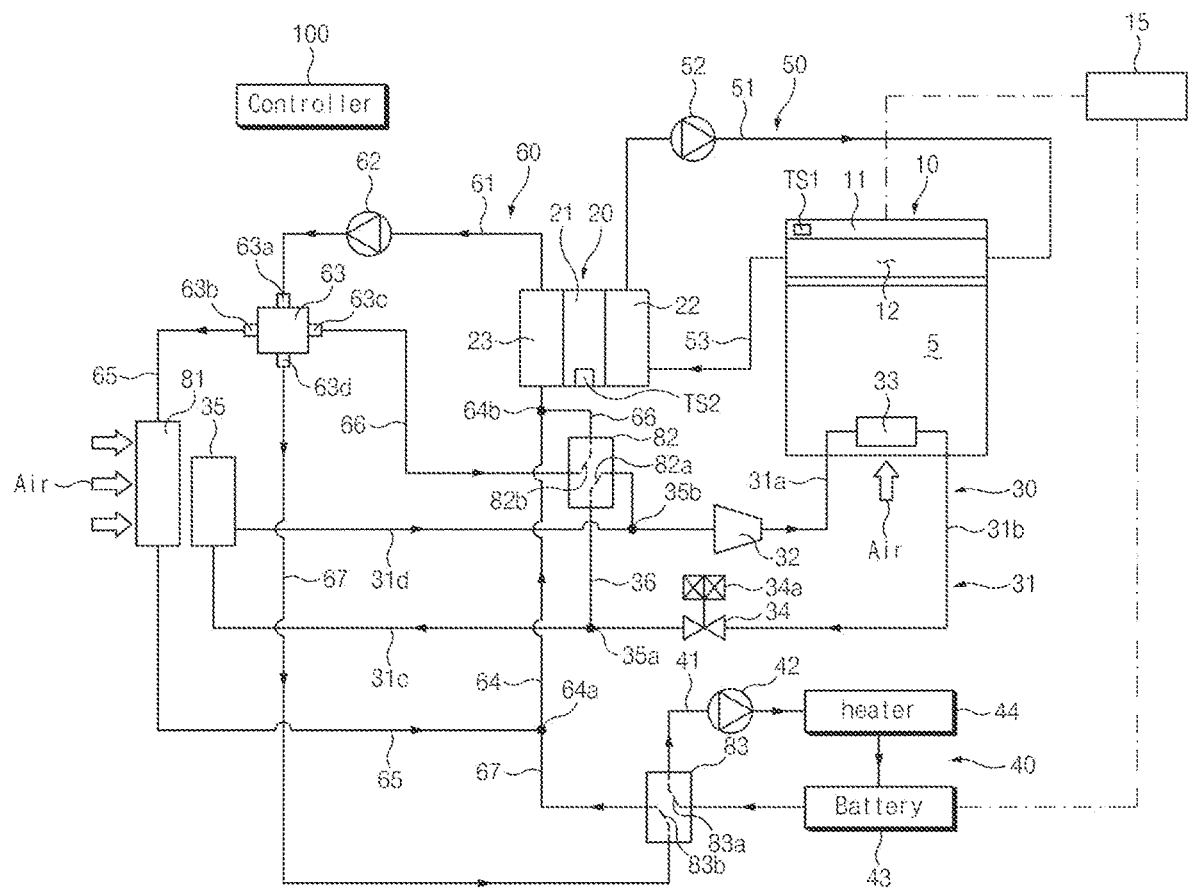
FIG. 2 illustrates a configuration of a vehicle solar system according to an exemplary embodiment of the present disclosure.

Referring to FIG. 2, the first coolant circulation circuit 50 may include a first coolant supply line 51 allowing the first coolant to flow from the first coolant chamber 22 of the heat storage tank 20 to the cooling channel 12 of the solar module 10, a first coolant return line 53 allowing the first coolant to return from the cooling channel 12 of the solar module 10 to the first coolant chamber 22 of the heat storage tank 20, and a first coolant pump 52 allowing the first coolant to circulate. The first coolant pump 52 may be fluidly connected to the first coolant supply line 51, and an inlet of the first coolant pump 52 may be spaced apart from an outlet of the first coolant chamber 22. The first coolant may be allowed to circulate between the cooling channel 12 of the solar module 10 and the first coolant chamber 22 of the heat storage tank 20 by the first coolant pump 52.

Figure 3:
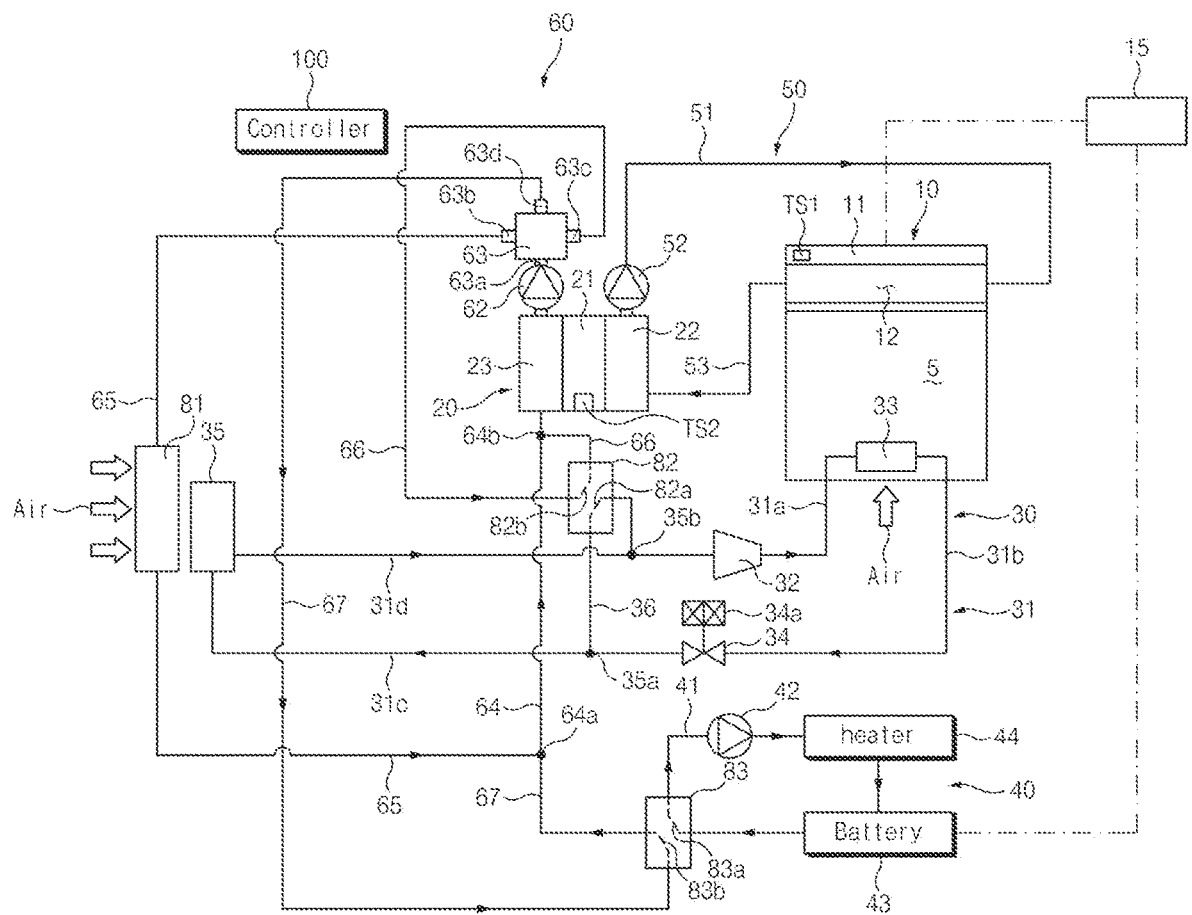
FIG. 3 illustrates a modification to the configuration of the vehicle solar system illustrated in FIG. 2.

According to an exemplary embodiment illustrated in FIG. 3, the first coolant pump 52 and the first coolant chamber 22 may be integrally joined. Specifically, the inlet of the first coolant pump 52 may be directly connected to the outlet of the first coolant chamber 22. As the first coolant pump 52 is integrally joined to the first coolant chamber 22 of the heat storage tank 20, the first coolant pump 52 and the heat storage tank 20 may be modularized. Accordingly, a length of the first coolant supply line 51 may be reduced, a layout of the first coolant pump 52 and the heat storage tank 20 may become more compact, and vibration characteristics of the first coolant pump 52 may be improved.

The heat storage tank 20 may include a second coolant chamber 23 contacting a second side surface of the heat storage chamber 21. The first coolant chamber 22 and the second coolant chamber 23 may be disposed to face each other on both side surfaces of the heat storage chamber 21. The first coolant chamber 22 may be fluidly separated from the second coolant chamber 23, and the first coolant chamber 22 may be thermally connected to the second coolant chamber 23 through the heat storage chamber 21.

The first coolant received in the cooling channel 12 of the solar module 10 may absorb heat from the solar panel 11 of the solar module 10 so that the solar panel 11 may be cooled to an appropriate temperature. The first coolant may be directed to the first coolant chamber 22, and the first coolant may transfer the heat absorbed from the solar panel 11 to the heat storage material of the heat storage chamber 21 so that the temperature of the heat storage material in the heat storage chamber 21 may increase to a predetermined temperature, and the heat storage material may store heat therein. A second coolant received in the second coolant chamber 23 may absorb heat from the heat storage material of the heat storage chamber 21 so that the temperature of the second coolant may increase to a predetermined temperature.

The vehicle solar system according to an exemplary embodiment of the present disclosure may include a panel radiator 81 thermally connected to the second coolant chamber 23 of the heat storage tank 20, and the panel radiator 81 may be fluidly connected to the second coolant chamber 23 through a second coolant circulation circuit 60. Referring to FIG. 1, the panel radiator 81 may be disposed adjacent to a front grille of the vehicle 1. The panel radiator 81 may have a coolant passage therein, and the second coolant may pass through the coolant passage. The panel radiator 81 may transfer heat between the second coolant and ambient air. The second coolant passing through the coolant passage of the panel radiator 81 may be cooled by the air passing by an exterior surface of the panel radiator 81.

The vehicle solar system according to an exemplary embodiment of the present disclosure may further include an auxiliary heat exchanger 82 thermally connected to the second coolant chamber 23 of the heat storage tank 20, and the second coolant chamber 23 may be thermally connected to the HVAC system 30 through the auxiliary heat exchanger 82. The second coolant chamber 23 may be fluidly connected to the auxiliary heat exchanger 82 through the second coolant circulation circuit 60.

The vehicle solar system according to an exemplary embodiment of the present disclosure may further include a battery chiller 83 thermally connected to the second coolant chamber 23 of the heat storage tank 20, and the second coolant chamber 23 may be thermally connected to a battery cooling system 40 through the battery chiller 83. The second coolant chamber 23 may be fluidly connected to the battery chiller 83 through the second coolant circulation circuit 60.

The second coolant circulation circuit 60 may be configured to selectively direct the second coolant discharged from the second coolant chamber 23 of the heat storage tank 20 to at least one of the panel radiator 81, the auxiliary heat exchanger 82, and the battery chiller 83 and allow the second coolant to return to the second coolant chamber 23 of the heat storage tank 20.

Referring to FIG. 2, the second coolant circulation circuit 60 may include a second coolant supply line 61 allowing the second coolant to flow from the second coolant chamber 23 of the heat storage tank 20 to the panel radiator 81, the auxiliary heat exchanger 82, and the battery chiller 83.

The second coolant circulation circuit 60 may include a second coolant return line 64 allowing the second coolant to return from the panel radiator 81, the auxiliary heat exchanger 82, and the battery chiller 83 to the second coolant chamber 23.

Referring to FIG. 2, the second coolant circulation circuit 60 may include a second coolant pump 62 allowing the second coolant to circulate, and the second coolant pump 62 may be disposed on the second coolant supply line 61. An inlet of the second coolant pump 62 may be spaced apart from an outlet of the second coolant chamber 23.

The second coolant circulation circuit 60 may include a plurality of distribution lines 65, 66, and 67 branched from the second coolant supply line 61 and joined at the second coolant return line 64. The plurality of distribution lines 65, 66, and 67 may include a first distribution line 65 branched from the second coolant supply line 61 to the panel radiator 81, a second distribution line 66 branched from the second coolant supply line 61 to the auxiliary heat exchanger 82, and a third distribution line 67 branched from the second coolant supply line 61 to the battery chiller 83.

Referring to FIG. 2, the second coolant circulation circuit 60 may include a control valve 63 disposed between the second coolant supply line 61 and the plurality of distribution lines 65, 66, and 67. The control valve 63 may include an inlet port 63a communicating with the second coolant chamber 23, a first outlet port 63b communicating with the panel radiator 81, a second outlet port 63c communicating with the auxiliary heat exchanger 82, and a third outlet port 63d communicating with the battery chiller 83.

The control valve 63 may open at least one of the first outlet port 63b, the second outlet port 63c, and the third outlet port 63d so that it may control the flow of the second coolant from the second coolant chamber 23 to at least one of the panel radiator 81, the auxiliary heat exchanger 82, and the battery chiller 83.

An inlet of the first distribution line 65 may be connected to the first outlet port 63b of the control valve 63, and an outlet of the first distribution line 65 may be connected to one point 64a of the second coolant return line 64. The panel radiator 81 may be disposed on the first distribution line 65. When the second coolant pump 62 operates, and the first outlet port 63b of the control valve 63 is opened, the second coolant may be supplied from the second coolant chamber 23 to the panel radiator 81 through the first distribution line 65, and then the second coolant may return from the panel radiator 81 to the second coolant chamber 23 through the second coolant return line 64.

An inlet of the second distribution line 66 may be connected to the second outlet port 63c of the control valve 63, and an outlet of the second distribution line 66 may be connected to the other point 64b of the second coolant return line 64. The auxiliary heat exchanger 82 may be disposed on the second distribution line 66. When the second coolant pump 62 operates, and the second outlet port 63c of the control valve 63 is opened, the second coolant may be supplied from the second coolant chamber 23 to the auxiliary heat exchanger 82 through the second distribution line 66, and then the second coolant may return from the auxiliary heat exchanger 82 to the second coolant chamber 23 through the second coolant return line 64.

An inlet of the third distribution line 67 may be connected to the third outlet port 63d of the control valve 63, and an outlet of the third distribution line 67 may be connected to one point 64a of the second coolant return line 64. The battery chiller 83 may be disposed on the third distribution line 67. When the second coolant pump 62 operates and the third outlet port 63d of the control valve 63 is opened, the second coolant may be supplied from the second coolant chamber 23 to the battery chiller 83 through the third distribution line 67, and then the second coolant may return from the battery chiller 83 to the second coolant chamber 23 through the second coolant return line 64.

According to the exemplary embodiment illustrated in FIG. 3, the second coolant pump 62 and the second coolant chamber 23 may be integrally joined. Specifically, the inlet of the second coolant pump 62 may be directly connected to the outlet of the second coolant chamber 23. As the second coolant pump 62 is integrally joined to the second coolant chamber 23 of the heat storage tank 20, the second coolant pump 62 and the heat storage tank 20 may be modularized. Accordingly, a layout of the second coolant pump 62 and the heat storage tank 20 may become more compact, and vibration characteristics of the second coolant pump 62 may be improved.

According to the exemplary embodiment illustrated in FIG. 3, the second coolant pump 62 and the second coolant chamber 23 of the heat storage tank 20 may be joined so that the vibration characteristics of the second coolant pump 62 may be improved. In addition, the inlet port 63a of the control valve 63 may be directly connected to an outlet of the second coolant pump 62, and thus the second coolant supply line 61 may be removed. The control valve 63 and the second coolant pump 62 may be integrally joined to the second coolant chamber 23 of the heat storage tank 20 so that the control valve 63, the second coolant pump 62, and the heat storage tank 20 may be modularized. Accordingly, a layout of the control valve 63, the second coolant pump 62, and the heat storage tank 20 may become more compact, and vibration characteristics of the control valve 63 and the second coolant pump 62 may be improved.

Referring to FIG. 2, the HVAC system 30 may include a refrigerant circulation path 31 through which a refrigerant circulates. A compressor 32, an interior condenser 33, a heating-side expansion valve 34, and an exterior heat exchanger 35 may be disposed on the refrigerant circulation path 31. The compressor 32 may compress the refrigerant. The interior condenser 33 may be disposed on the downstream side of the compressor 32, and the refrigerant discharged from the compressor 32 may exchange heat with the air passing by an exterior surface of the interior condenser 33 so that the refrigerant may be condensed, and the air may be heated. The air heated by the interior condenser 33 may be blown into the passenger compartment 5 by a blower (not shown). The heating-side expansion valve 34 may be disposed on the downstream side of the interior condenser 33, and the refrigerant condensed by the interior condenser 33 may be expanded through the heating-side expansion valve 34. The heating-side expansion valve 34 may be an electronic expansion valve (EXV) of which the opening degree is adjusted by an electronic actuator 34a. The exterior heat exchanger 35 may be disposed on the downstream side of the heating-side expansion valve 34, and the exterior heat exchanger 35 may transfer heat between the air supplied from the grille of the vehicle 1 and the refrigerant. The refrigerant expanded by the heating-side expansion valve 34 may be evaporated by the exterior heat exchanger 35, and the refrigerant evaporated by the exterior heat exchanger 35 may be directed into the compressor 32. Referring to FIG. 1, the exterior heat exchanger 35 together with the panel radiator 81 may be disposed adjacent to the grille of the vehicle 1.

Referring to FIG. 2, the refrigerant circulation path 31 may include a first line 31a extending from an outlet of the compressor 32 to the interior condenser 33, a second line 31b extending from the interior condenser 33 to the heating-side expansion valve 34, a third line 31c extending from the heating-side expansion valve 34 to the exterior heat exchanger 35, and a fourth line 31d extending from the exterior heat exchanger 35 to an inlet of the compressor 32.

In addition, the HVAC system 30 may include a cooling-side expansion valve (not shown) and an evaporator (not shown) disposed between the exterior heat exchanger 35 and the compressor 32. When the HVAC system 30 operates in a heating mode, the refrigerant may bypass the cooling-side expansion valve and the evaporator, and the refrigerant discharged from the exterior heat exchanger 35 may be directed into the compressor 32. When the HVAC system 30 operates in a cooling mode, the heating-side expansion valve 34 may be fully opened so that the refrigerant passing through the heating-side expansion valve 34 may not be expanded, and the refrigerant may pass through the cooling-side expansion valve and the evaporator.

The HVAC system 30 may further include a bypass line 36 allowing the refrigerant discharged from the heating-side expansion valve 34 to be directed from an upstream point 35a of the exterior heat exchanger 35 to a downstream point 35b of the exterior heat exchanger 35. That is, as a portion of the refrigerant discharged from the heating-side expansion valve 34 passes through the bypass line 36, it may bypass the exterior heat exchanger 35.

The HVAC system 30 may be thermally connected to the second coolant chamber 23 of the heat storage tank 20 through the auxiliary heat exchanger 82. The auxiliary heat exchanger 82 may be disposed on the bypass line 36, and the auxiliary heat exchanger 82 may include a first passage 82a fluidly connected to the bypass line 36, and a second passage 82b fluidly connected to the second distribution line 66 of the second coolant circulation circuit 60. The refrigerant passing through the first passage 82a may absorb heat from the second coolant passing through the second passage 82b so that the refrigerant passing through the first passage 82a may be evaporated, and the second coolant may be cooled.

The battery cooling system 40 may be configured to cool the battery 43 or warm-up the battery 43. Referring to FIG. 2, the battery cooling system 40 may include a battery coolant circulation path 41 through which a battery coolant circulates, a battery pump 42 fluidly connected to the battery coolant circulation path 41, a battery warmer 44, and the battery 43. The battery coolant may be allowed to circulate the battery warmer 44 and the battery 43 by the battery pump 42.

The battery cooling system 40 may be thermally connected to the second coolant chamber 23 of the heat storage tank 20 through the battery chiller 83. The battery chiller 83 may include a first passage 83a fluidly connected to the battery coolant circulation path 41, and a second passage 83b fluidly connected to the third distribution line 67 of the second coolant circulation circuit 60. When the temperature of the heat storage tank 20 is higher than the temperature of the battery 43, the battery coolant passing through the first passage 83a may absorb heat from the second coolant passing through the second passage 83b so that the battery coolant passing through the first passage 83a may be heated.

A battery management system (not shown) may monitor a state of the battery 43, and the battery management system may generate instructions on the cooling of the battery 43 or the warming-up of the battery 43 according to the state of the battery 43, and the instructions on the cooling of the battery 43 or the warming-up of the battery 43 may be transmitted from the battery management system (not shown) to a controller 100.

The controller 100 may control the first coolant pump 52, the second coolant pump 62, the control valve 63, the compressor 32, the electronic actuator 34a of the heating-side expansion valve 34, and the battery pump 42, thereby controlling the overall operation of the vehicle solar system.

Figure 4:
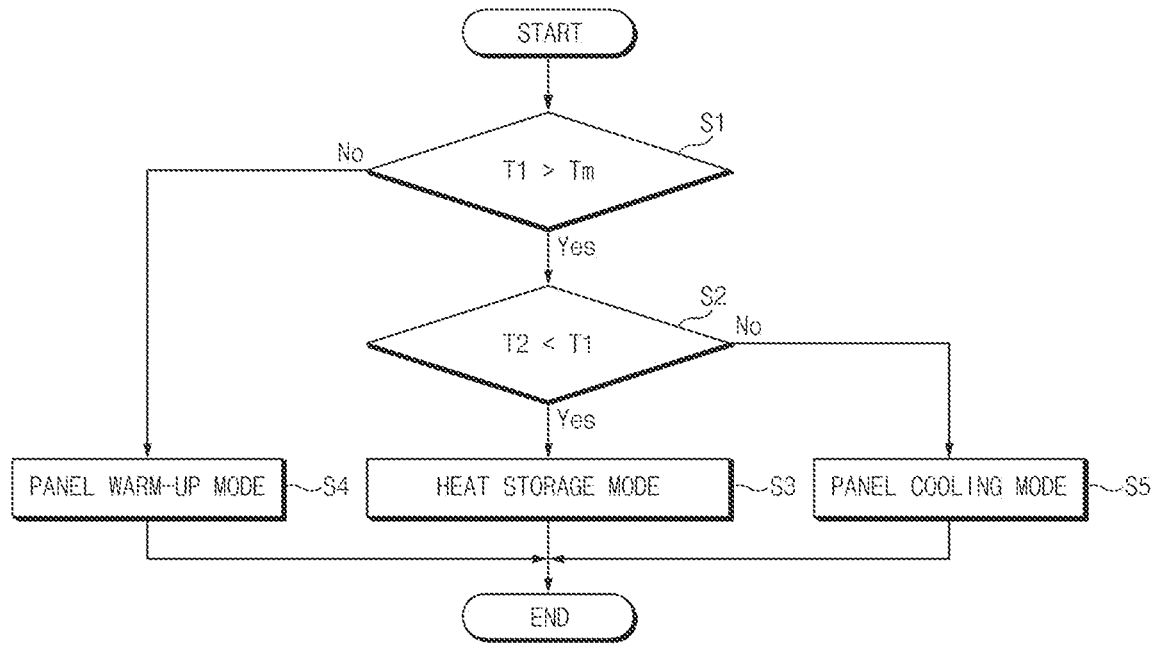
FIG. 4 illustrates a flowchart of a method of controlling a vehicle solar system according to an exemplary embodiment of the present disclosure.

FIG. 4 illustrates a flowchart of a method of controlling a vehicle solar system according to an exemplary embodiment of the present disclosure.

The controller 100 may determine whether a temperature T1 of the solar panel 11 of the solar module 10 sensed by the first temperature sensor TS1 is higher than an optimal operating temperature Tm of the solar panel 11 (S1). The optimal operating temperature Tm refers to a temperature at which power generation efficiency of the solar panel 11 is optimized. For example, the optimal operating temperature Tm may be 20° C.

When it is determined in S1 that the temperature T1 of the solar panel 11 is higher than the optimal operating temperature Tm, the controller 100 may determine whether a temperature T2 of the heat storage chamber 21 sensed by the second temperature sensor TS2 is lower than the temperature T1 of the solar panel 11 (S2).

When it is determined in S2 that the temperature T2 of the heat storage chamber 21 is lower than the temperature T1 of the solar panel 11, the controller 100 may perform a heat storage mode (S3). The heat storage mode refers to a mode in which the heat of the solar panel 11 is stored in the heat storage chamber 21 of the heat storage tank 20 using the first coolant. Specifically, the first coolant pump 52 may be activated by the controller 100 so that the first coolant may circulate between the cooling channel 12 of the solar module 10 and the first coolant chamber 22 of the heat storage tank 20 through the first coolant supply line 51 and the first coolant return line 53. Accordingly, the heat of the solar panel 11 may be transferred to the first coolant chamber 22 using the first coolant passing through the cooling channel 12, and the heat transferred to the first coolant chamber 22 may be transferred to the heat storage material of the heat storage chamber 21 so that the heat storage material may store heat therein at a predetermined temperature.

When it is determined in S1 that the temperature T1 of the solar panel 11 is lower than or equal to the optimal operating temperature Tm, the controller 100 may perform a panel warm-up mode (S4). The panel warm-up mode refers to a mode in which the warming-up of the solar panel 11 is performed until the temperature of the solar panel 11 reaches the optimal operating temperature Tm. Specifically, the first coolant pump 52 may be turned off by the controller 100 so that the first coolant may not circulate between the cooling channel 12 of the solar module 10 and the first coolant chamber 22 of the heat storage tank 20 through the first coolant supply line 51 and the first coolant return line 53, and accordingly the temperature of the solar panel 11 may rise by solar energy until it reaches the optimal operating temperature Tm.

When it is determined in S2 that the temperature T2 of the heat storage chamber 21 is higher than or equal to the temperature T1 of the solar panel 11, the controller 100 may perform a panel cooling mode (S5). The panel cooling mode refers to a mode in which the solar panel 11 is cooled to an appropriate temperature. Specifically, the first coolant pump 52 and the second coolant pump 62 may be activated by the controller 100, and the first outlet port 63b of the control valve 63 may be opened by the controller 100. Accordingly, the first coolant chamber 22 may absorb heat from the solar panel 11 through the first coolant circulated by the first coolant pump 52, and the heat absorbed by the first coolant chamber 22 may be transferred to the heat storage chamber 21. The heat of the heat storage chamber 21 may be transferred to the second coolant chamber 23, and the heat of the second coolant chamber 23 may be transferred to the panel radiator 81 through the second coolant circulated by the second coolant pump 62 so that the solar panel 11 may be cooled.

Figure 5:
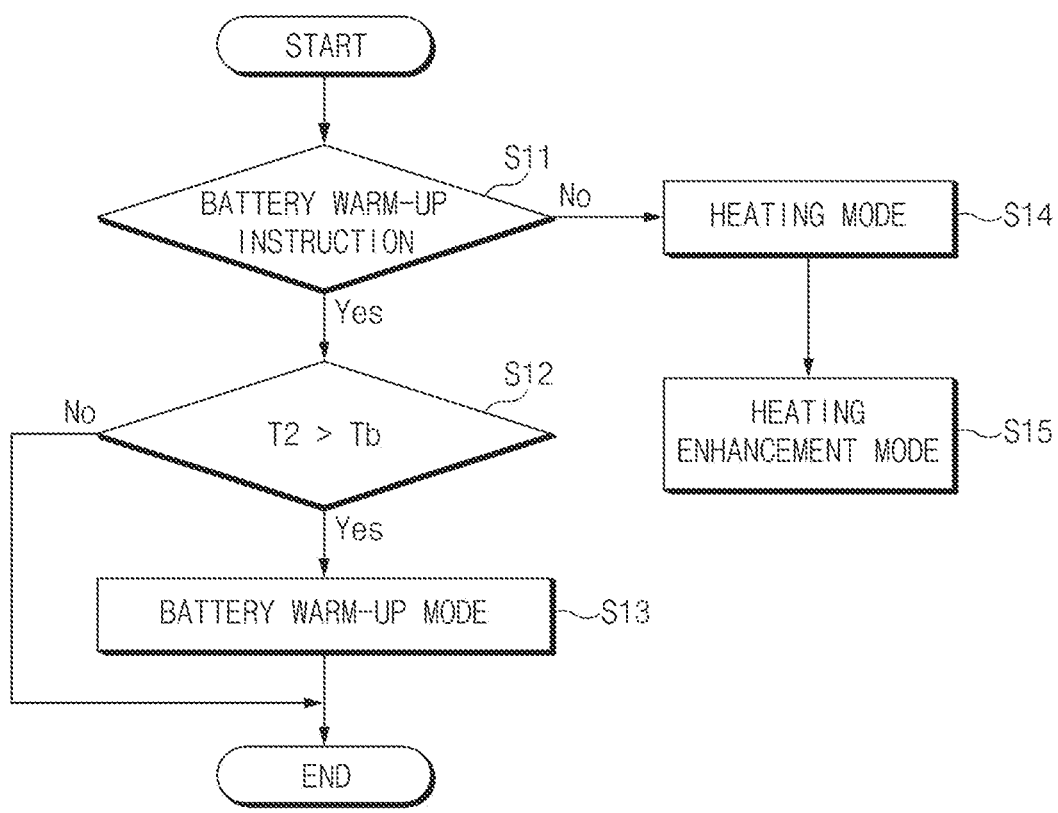
FIG. 5 illustrates a flowchart of a method of controlling a vehicle solar system according to another exemplary embodiment of the present disclosure.

FIG. 5 illustrates a flowchart of a method of controlling a vehicle solar system according to another exemplary embodiment of the present disclosure.

It may be determined whether a battery warm-up instruction is transmitted from the battery management system (not shown) to the controller 100 (S11). When a temperature of the battery 43 is lower than a predetermined threshold temperature, the battery management system may generate the battery warm-up instruction for increasing the temperature of the battery 43, and the battery warm-up instruction may be transmitted from the battery management system to the controller 100.

When it is determined in S11 that the battery warm-up instruction is transmitted to the controller 100, the controller 100 may determine whether the temperature T2 of the heat storage chamber 21 sensed by the second temperature sensor TS2 is higher than a temperature Tb of the battery 43 (S12).

When it is determined in S12 that the temperature T2 of the heat storage chamber 21 is higher than the temperature Tb of the battery 43, the controller 100 may perform a battery warm-up mode (S13). The battery warm-up mode refers to a mode in which the warming-up of the battery 43 is performed until the temperature of the battery 43 reaches an optimal operating temperature. Specifically, the second coolant pump 62 may be activated by the controller 100, and the third outlet port 63d of the control valve 63 may be opened by the controller 100 so that the second coolant may circulate between the second coolant chamber 23 and the second passage 83b of the battery chiller 83. Accordingly, the heat of the second coolant passing through the second passage 83b of the battery chiller 83 may be transferred to the battery coolant passing through the first passage 83a of the battery chiller 83 so that the battery coolant may warm up the battery 43.

When it is determined in S12 that the temperature T2 of the heat storage chamber 21 is lower than or equal to the temperature Tb of the battery 43, the method may end.

When it is determined in S11 that the battery warm-up instruction is not transmitted to the controller 100, the controller 100 may perform a heating mode based on an ambient temperature and a heating condition(s) set by a user (S14). The heating mode refers to a mode in which the passenger compartment 5 is heated. Specifically, the compressor 32 may compress the refrigerant, and the compressed refrigerant may be condensed through the interior condenser 33. The condensed refrigerant may be expanded through the heating-side expansion valve 34, and the expanded refrigerant may be evaporated through the exterior heat exchanger 35 and then be directed into the compressor 32. As the refrigerant is condensed through the interior condenser 33, the air blown into the passenger compartment 5 may be heated, and accordingly the heating of the passenger compartment 5 may be performed.

After S14, the controller 100 may perform a heating enhancement mode based on the ambient temperature and the heating condition(s) set by the user (S15). The heating enhancement mode refers to a mode in which the heating of the passenger compartment 5 is further enhanced. Specifically, the second coolant pump 62 may be activated by the controller 100, and the second outlet port 63c of the control valve 63 may be opened by the controller 100 so that the second coolant may circulate between the second coolant chamber 23 and the second passage 82b of the auxiliary heat exchanger 82. The heat of the second coolant passing through the second passage 82b of the auxiliary heat exchanger 82 may be transferred to the refrigerant passing through the first passage 82a of the auxiliary heat exchanger 82 so that the refrigerant may be additionally evaporated by the auxiliary heat exchanger 82, and thus the heating of the passenger compartment 5 may be further enhanced.

As set forth above, the vehicle solar system and the method of controlling the same according to exemplary embodiments of the present disclosure may be designed to use the solar energy in vehicle thermal management (the heating of the passenger compartment, the warming-up of the battery, etc.) as well as converting the solar energy into the electric energy (power generation), thereby significantly improving the efficiency of solar energy utilization. Thus, the overall energy efficiency of the vehicle may be significantly improved.

According to exemplary embodiments of the present disclosure, when the amount of solar radiation is relatively high, the temperature of the solar panel may be prevented from excessively rising so that deterioration in power generation efficiency may be prevented.

According to exemplary embodiments of the present disclosure, the solar energy may be stored in the heat storage tank so that the stored heat energy may be provided as a heating source of the HVAC system, and thus all electric range (AER) of an electric vehicle may be significantly increased.

According to exemplary embodiments of the present disclosure, the use of solar energy (renewable energy) may be maximized, which ensures carbon neutrality and life cycle assessment (LCA) competitiveness of future mobility.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A vehicle solar system, comprising:
   a solar module mounted on an exterior surface of a vehicle, the solar module including a solar panel and a cooling channel positioned in the solar panel;
   a heat storage tank thermally connected to the cooling channel of the solar module; and
   a panel radiator thermally connected to the heat storage tank;
   wherein the heat storage tank includes:
      a heat storage chamber in which a heat storage material is stored;
      a first coolant chamber contacting a first side surface of the heat storage chamber; and
      a second coolant chamber contacting a second side surface of the heat storage chamber.

2. The vehicle solar system according to claim 1, wherein the first coolant chamber is fluidly connected to the cooling channel of the solar module through a first coolant circulation circuit.

3. The vehicle solar system according to claim 2, wherein the first coolant circulation circuit includes:
   a first coolant supply line allowing a first coolant to flow from the first coolant chamber to the cooling channel of the solar module;
   a first coolant return line allowing the first coolant to return from the cooling channel of the solar module to the first coolant chamber; and
   a first coolant pump allowing the first coolant to circulate.

4. The vehicle solar system according to claim 2, wherein the first coolant pump and the first coolant chamber are integrally joined.

5. The vehicle solar system according to claim 1, wherein the second coolant chamber is fluidly connected to the panel radiator through a second coolant circulation circuit.

6. The vehicle solar system according to claim 5, further comprising an auxiliary heat exchanger fluidly connected to the second coolant chamber through the second coolant circulation circuit,
   wherein the second coolant chamber is thermally connected to a heating, ventilation, and air conditioning (HVAC) system through the auxiliary heat exchanger.

7. The vehicle solar system according to claim 6, further comprising a battery chiller fluidly connected to the second coolant chamber through the second coolant circulation circuit,
   wherein the second coolant chamber is thermally connected to a battery cooling system through the battery chiller.

8. The vehicle solar system according to claim 7, wherein the second coolant circulation circuit is configured to direct a second coolant discharged from the second coolant chamber to at least one of the panel radiator, the auxiliary heat exchanger, and the battery chiller, and to allow the second coolant to return to the second coolant chamber.

9. The vehicle solar system according to claim 8, wherein the second coolant circulation circuit includes:
   a second coolant supply line allowing the second coolant to flow from the second coolant chamber to the panel radiator, the auxiliary heat exchanger, and the battery chiller;
   a second coolant return line allowing the second coolant to return from the panel radiator, the auxiliary heat exchanger, and the battery chiller to the second coolant chamber;
   a plurality of distribution lines branched from the second coolant supply line and joined at the second coolant return line;

a control valve disposed between the second coolant supply line and the plurality of distribution lines; and a second coolant pump allowing the second coolant to circulate;

wherein the panel radiator is connected to a first distribution line of the plurality of distribution lines, the auxiliary heat exchanger is connected to a second distribution line of the plurality of distribution lines, and the battery chiller is connected to a third distribution lines of the plurality of distribution lines.

10. The vehicle solar system according to claim 9, wherein the control valve and the second coolant pump are integrally joined to the second coolant chamber.

11. The vehicle solar system according to claim 9, wherein the plurality of distribution lines include:

the first distribution line branched from the second coolant supply line to the panel radiator;

the second distribution line branched from the second coolant supply line to the auxiliary heat exchanger; and the third distribution line branched from the second coolant supply line to the battery chiller.

12. The vehicle solar system according to claim 9, wherein the control valve includes an inlet port communicating with the second coolant chamber, a first outlet port communicating with the panel radiator, a second outlet port communicating with the auxiliary heat exchanger, and a third outlet port communicating with the battery chiller.

13. The vehicle solar system according to claim 12, wherein the control valve is configured to open at least one of the first outlet port, the second outlet port, and the third outlet port.

14. A method of controlling a vehicle solar system including a solar module including a solar panel and a cooling channel positioned in the solar panel, a heat storage tank fluidly connected to the cooling channel of the solar module through a first coolant circulation circuit, a panel radiator fluidly connected to the heat storage tank through a second coolant circulation circuit, an auxiliary heat exchanger fluidly connected to the heat storage tank through the second coolant circulation circuit and thermally connected to an HVAC system, and a battery chiller fluidly connected to the heat storage tank through the second coolant circulation circuit and thermally connected to a battery cooling system, the method comprising:

allowing a first coolant to circulate between the cooling channel and the heat storage tank based on a temperature of the heat storage tank and a temperature of the solar panel; and allowing a second coolant to circulate between the heat storage tank and the panel radiator based on the temperature of the solar panel.

15. The method according to claim 14, further comprising allowing the second coolant to circulate between the heat storage tank and the panel radiator based on the temperature of the heat storage tank and the temperature of the solar panel.

16. The method according to claim 14, further comprising allowing the second coolant to circulate between the heat storage tank and the auxiliary heat exchanger based on an ambient temperature.

17. The method according to claim 14, further comprising allowing the second coolant to circulate between the heat storage tank and the battery chiller based on the temperature of the heat storage tank and a temperature of a battery.

* * * * *